US 6,382,826 B1
May 7, 2002

(54) COMPACT EXTRUDER WITH MULTIPLE PARALLEL SCREWS HAVING A VARIABLE PITCH ARRANGEMENT

(75) Inventor: Giovanni Della Rossa, Milan (IT)

(73) Assignee: Costruzioni Meccaniche Luigi Bandera S.p.A., Busto Arsizio (IT)

( * ) Notice: Subject to any disclaimer, the term of this patent is extended or adjusted under 35 U.S.C. 154(b) by 0 days.

(21) Appl. No.: 09/587,570

(22) Filed: Jun. 6, 2000

(30) Foreign Application Priority Data

Jun. 11, 1999 (IT) ........................................ MI990379 U

(51) Int. Cl.[7] ................................................ B29B 7/48
(52) U.S. Cl. ............................. 366/85; 366/86; 366/88; 366/91; 366/100; 366/291; 366/301; 366/323
(58) Field of Search ................................ 366/83–86, 88, 366/91, 290, 291, 297–301, 323, 75, 100; 425/204, 208, 209

(56) References Cited

U.S. PATENT DOCUMENTS

| | | | |
|---|---|---|---|
| 1,433,865 A | * | 10/1922 | Wolf |
| 1,916,885 A | * | 7/1933 | Kirschbraun |
| 2,235,311 A | * | 3/1941 | Bullard |
| 3,380,116 A | * | 4/1968 | Cox et al. |
| 3,602,484 A | * | 8/1971 | Poncet |
| 4,057,376 A | * | 11/1977 | Berger |
| 4,797,080 A | * | 1/1989 | Wanninger |
| 4,877,390 A | * | 10/1989 | Ocker et al. |
| 5,415,473 A | * | 5/1995 | Nakano et al. |
| 6,024,479 A | * | 2/2000 | Haring |

* cited by examiner

Primary Examiner—Charles E. Cooley
(74) Attorney, Agent, or Firm—Oblon, Spivak, McClelland, Maier & Neustadt, P.C.

(57) ABSTRACT

A compact extruder with multiple parallel screws having a variable pitch arrangement, includes an outer casing which has at least two chambers that contain at least two screws which allow material to flow from one chamber to the other chamber through a passage, and that present a feed inlet for the material to be treated and an outlet for the material; each chamber has at least one pair of housings for the corresponding pair of screws which engage with one another, each screw presenting a long-pitch portion and a short-pitch portion.

7 Claims, 2 Drawing Sheets

COMPACT EXTRUDER WITH MULTIPLE PARALLEL SCREWS HAVING A VARIABLE PITCH ARRANGEMENT

BACKGROUND OF THE INVENTION

1. Field of the Invention

This invention relates to a compact extruder with multiple parallel screws having a variable pitch arrangement.

2. Description of the Related Art

At present, extruders of various types, especially twin-screw extruders, are used in the extrusion technique employed for materials in general.

These types of known extruders, which are used, for example, for materials which are not easily mixed and contain volatile substances, are somewhat large; their overall dimensions can be up to 30–45 times the diameter of the screw.

In order to make these extruders shorter, specially shaped screws with variable cross-sections have been designed; however, the manufacture of such screws is rather complex.

The costs of manufacturing and assembling such extruders are equally high in view of the length of the extruders, the component parts and the associated assembly, running and maintenance costs.

SUMMARY OF THE INVENTION

The purpose of this invention is to make an extruder with two or more screws which simply and rapidly solves the problems briefly described above in general.

Another purpose of this invention is to make an extruder with small overall dimensions and short length which is compact and can be adapted for various treatments of different materials.

These and other purposes are achieved by this invention, which relates to a compact extruder with multiple parallel screws, comprising an outer casing which includes at least two chambers; the chambers contain at least two screws, which allow material to flow from one chamber to the other through a passage, and present a feed inlet for the material to be treated by the extruder and an outlet for the material; the extruder is characterized in that each chamber is constituted by at least one pair of housings for the corresponding pair of screws which engage with one another, each screw presenting a long-pitch portion and a short-pitch portion.

The long-pitch portion preferably has a constant pitch. Advantageously, the long-pitch portion will also be longer than the short-pitch portion. In particular, the short-pitch portion is of variable pitch.

In a special, preferred embodiment of the invention, the variable short-pitch portion has sections with opposite threads.

BRIEF DESCRIPTION OF THE DRAWINGS

The characteristics and advantages of a compact extruder with multiple parallel screws in accordance with this invention will become clear from the following description, given by way of example and not of limitation, by reference to the schematic drawings annexed, in which.

DESCRIPTION OF THE PREFERRED EMBODIMENTS

Figure 1:
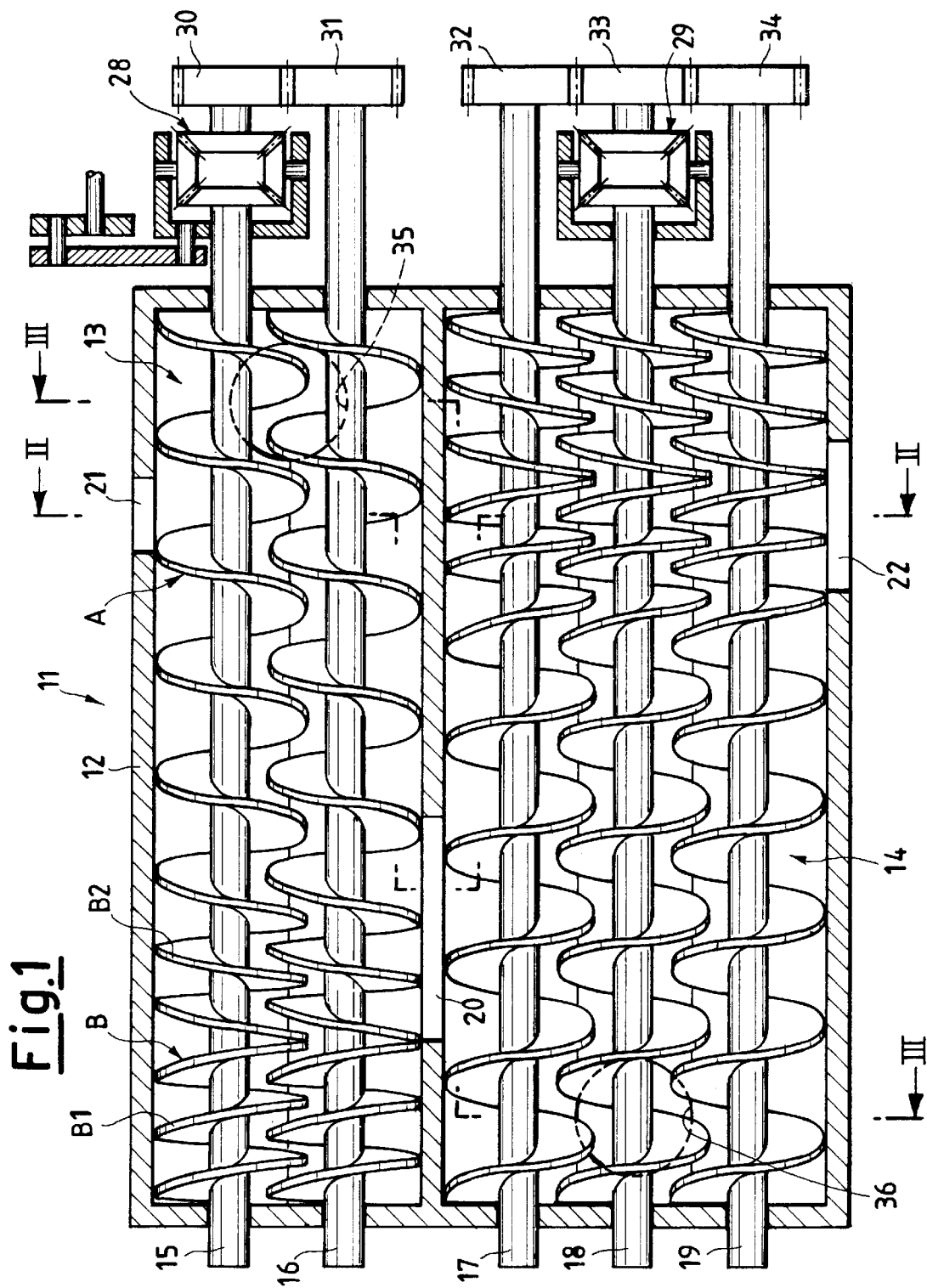
FIG. 1 shows the longitudinal section of a compact extruder with multiple parallel screws in accordance with this invention.

The figures show a compact extruder 11 with multiple parallel screws which are two sets of screws. The number of sets of screws and the number of screws in each set can differ from those shown.

Extruder 11 has an outer casing 12 which includes two chambers 13 and 14 containing a number of cylindrical screws. In the example shown, the first chamber 13 contains two screws 15 and 16, while the second chamber 14 contains three screws 17, 18 and 19.

Screws 15 and 16 allow material to flow from the one chamber 13 to the other chamber 14 through a passage 20. Casing 12 presents an inlet 21 through which a material or mixture of materials is fed into the extruder 11, and an outlet 22 through which the material is expelled.

Figure 2:
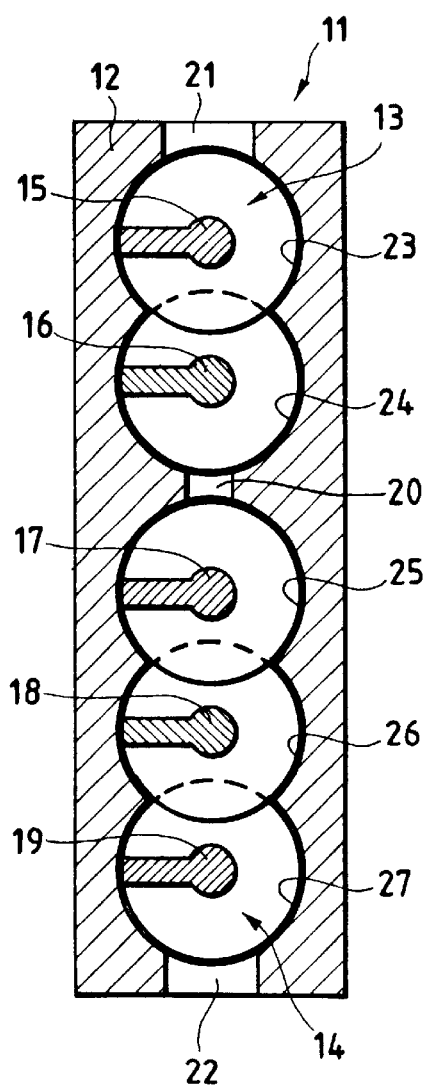
FIG. 2 is a cross-section along line II—II shown in FIG. 1.
Figure 3:
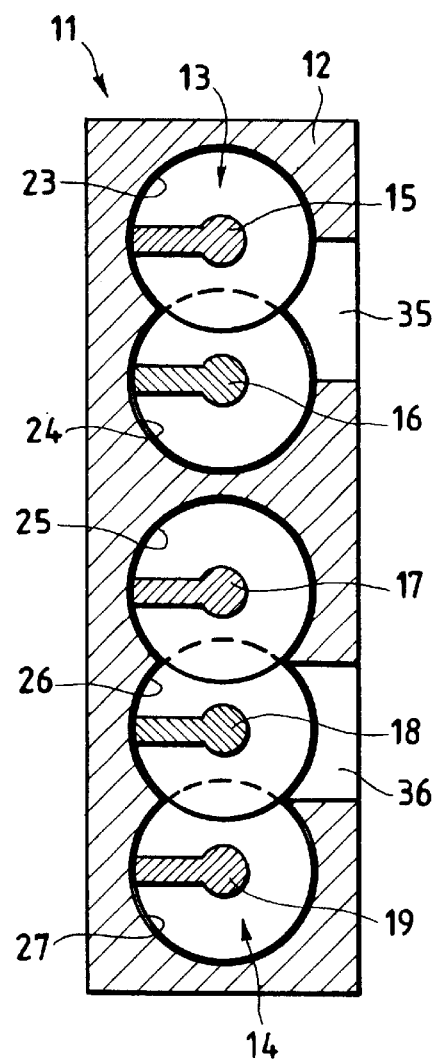
FIG. 3 is a cross-section along line III—III shown in FIG. 1.

Each chamber is constituted by housings for the screws it contains; as shown in FIGS. 2 and 3, the first chamber 13 contains two screw housings 23 and 24, and the second chamber 14 contains three screw housings 25, 26 and 27.

Screws 15 and 16 engage with one another, as do screws 17, 18 and 19 in the second chamber 14.

In accordance with this invention, as shown in FIG. 1, each screw presents a long-pitch portion marked "A" and a short-pitch portion marked "B" which, in the example shown, is also of variable pitch.

The long-pitch portion "A" has a constant pitch in the example shown, but its pitch could also be variable. Advantageously, long-pitch portion "A" will be longer than short-pitch portion "B".

Short-pitch portion "B" has a variable pitch, as mentioned; in the special, preferred embodiment shown in FIG. 1, the variable short-pitch portion "B" has sections "B1" and "B2" with opposite threads.

The opposite threads "B1" and "B2" are useful and necessary to prevent the advance of material and aid its flow from one chamber 13 to the other chamber 14 through the passage 20.

At least one of the screws in each set (in the example screw 15 and screw 18) is attached at one end to a pair of differentials 28 and 29. In this way, as a result of the presence of cogwheels 30–34, which are fitted to the screw shafts and exit from the differentials 28 and 29, the relative speeds of screws 15–19 can be continuously varied, thus enabling the threads of one screw to traverse in the compartment of the other.

The mixing and expelling of volatile substances will therefore be considerably increased, and the substances will exit from outlets 35 and 36, each of which is fitted with a valve not shown in the figures.

The extruder 11 in accordance with this invention therefore has a short length (approximately 5–10 times the screw diameter, whereas conventional extruders are much longer) and allows mixing of products which are hard to mix, making them purer, together with degassing, as substantially all volatile substances are removed.

The two chambers 13 and 14 containing the two sets of screws 15, 16 and 17, 18, 19 communicate with one another through the passage 20, thus enabling the material to circulate between one set of screws and the other. Moreover, there is a sufficiently large space between the compartments of the long-pitch threads to allow extraction of substantially all volatile substances through the outlets 35 and 36.

The speed variation effected by differentials 28 and 29 allows continuous variation of the relative speeds of the screws, thus enabling the threads of one screw to traverse in the compartment of the other. The mixture and expulsion of volatile substances is thus considerably increased. The advantages of this invention are therefore evident.

What is claimed is:

1. A compact extruder with multiple parallel screws having a variable pitch arrangement, comprising:

an outer casing which includes at least two chambers that contain at least two screws which allow material to flow from one chamber to the other chamber through a passage, and that have a feed inlet for the material to be treated and an outlet for the material;

wherein each chamber includes at least one pair of housings for the corresponding at least one pair of screws which engage with one another, each screw having a long-pitch portion and a short-pitch portion; and wherein at least one of the screws in each set of screws is attached at one end to a pair of differentials which, via cogwheels that are fitted to shafts of the screws and exit from the differentials, continuously vary speed of the screws.

2. A compact extruder as recited in claim 1, wherein the long-pitch portion has a constant pitch.

3. A compact extruder as recited in claim 1, wherein the long-pitch portion is longer than the short-pitch portion.

4. A compact extruder as recited in claim 1, wherein the short-pitch portion has a variable pitch.

5. A compact extruder as recited in claim 4, wherein the short-pitch portion with variable pitch has sections with opposite threads.

6. A compact extruder as recited in claim 1, further comprising outlets for expulsion of volatile substances from the chambers.

7. A compact extruder as recited in claim 1, wherein the screws are cylindrical.

\* \* \* \* \*

UNITED STATES PATENT AND TRADEMARK OFFICE
CERTIFICATE OF CORRECTION

PATENT NO. : 6,382,826 B1
DATED : May 7, 2002
INVENTOR(S) : Della Rossa

It is certified that error appears in the above-identified patent and that said Letters Patent is hereby corrected as shown below:

<u>Title page,</u>
Item [30], Foreign Application Priority Data should read
-- [30]     Foreign Application Priority Data
    Jun. 11, 1999     (IT) ................................... MI99U 000379 --

Signed and Sealed this

Eighth Day of October, 2002

*Attest:*

JAMES E. ROGAN
*Attesting Officer*      *Director of the United States Patent and Trademark Office*